United States Patent
Liu et al.

(10) Patent No.: US 12,376,116 B2
(45) Date of Patent: Jul. 29, 2025

(54) UPLINK TRANSMISSION METHOD AND APPARATUS, RESOURCE INDICATION METHOD AND APPARATUS, SERVING NODE, AND MEDIUM

(71) Applicant: ZTE Corporation, Shenzhen (CN)

(72) Inventors: Xing Liu, Shenzhen (CN); Peng Hao, Shenzhen (CN); Xianghui Han, Shenzhen (CN); Jing Shi, Shenzhen (CN); Kai Xiao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 537 days.

(21) Appl. No.: 17/629,880

(22) PCT Filed: Jul. 29, 2020

(86) PCT No.: PCT/CN2020/105426
§ 371 (c)(1),
(2) Date: May 19, 2022

(87) PCT Pub. No.: WO2021/018171
PCT Pub. Date: Feb. 4, 2021

(65) Prior Publication Data
US 2022/0322312 A1    Oct. 6, 2022

(30) Foreign Application Priority Data
Jul. 31, 2019  (CN) .......................... 201910703649.2

(51) Int. Cl.
*H04W 72/04*    (2023.01)
*H04W 52/14*    (2009.01)
(Continued)

(52) U.S. Cl.
CPC ......... *H04W 72/23* (2023.01); *H04W 52/146* (2013.01); *H04W 52/367* (2013.01)

(58) Field of Classification Search
CPC ............. H04W 72/23; H04W 72/0473; H04W 72/1268; H04W 52/146; H04W 52/367; H04W 52/54; H04L 5/0007; H04L 5/0066
See application file for complete search history.

(56) References Cited

U.S. PATENT DOCUMENTS

| | | | |
|---|---|---|---|
| 2014/0293900 A1* | 10/2014 | Takeda | H04L 5/0051 370/329 |
| 2016/0029239 A1* | 1/2016 | Sadeghi | H04W 52/244 370/252 |
| 2018/0359707 A1* | 12/2018 | Chae | H04W 52/383 |

FOREIGN PATENT DOCUMENTS

| | | |
|---|---|---|
| CN | 103053212 A | 4/2013 |
| CN | 1033053212 A | 4/2013 |

(Continued)

OTHER PUBLICATIONS

Nokia ("On intra-UE DL/UL prioritization for NR URLLC", 3GPP TSG RAN WG1 Meeting #96, Athens, Greece, Feb. 25, 2019) (Year: 2019).*

(Continued)

*Primary Examiner* — Jamal Javaid
(74) *Attorney, Agent, or Firm* — CANTOR COLBURN LLP

(57) ABSTRACT

Provided are an uplink transmission method and apparatus, a resource indication method and apparatus, a serving node, and a medium. The method includes the following, downlink control information is received, where the downlink control information includes a resource indication domain; and an uplink transmission mechanism is determined according to an indication resource indicated by the resource indication domain.

21 Claims, 4 Drawing Sheets

Receive downlink control information, where the downlink control information includes a resource indication domain — S110

Determine an uplink transmission mechanism according to an indication resource indicated by the resource indication domain — S120

(51) Int. Cl.
  *H04W 52/36*  (2009.01)
  *H04W 72/23*  (2023.01)

(56) References Cited

FOREIGN PATENT DOCUMENTS

| CN | 10824357 A   | 7/2018  |
|----|--------------|---------|
| CN | 108243457 A  | 7/2018  |
| CN | 109565387 A  | 4/2019  |
| CN | 109565678 A  | 4/2019  |
| CN | 110536404 A  | 12/2019 |
| KR | 20160114685 A | 10/2016 |
| KR | 20190039398 A | 4/2019  |

OTHER PUBLICATIONS

International Search Report for corresponding application PCT/CN2020/105426 filed Jul. 29, 2020; Mail date Oct. 28, 2020.
Sequans. "Considerations on UL inter-UE multiplexing for URLLC", 3GPP TSG RAN WG1 Meeting #95 R1-1813542, Nov. 16, 2018.
Catt, "Discussion on intra-UE multiplexing scenarios", 3GPP TSG RAN WG1 Ad-Hoc Meeting 1901, Taipei, Jan. 21-25, 2019.
European Search Report for corresponding application EP20847332; Report dated Jul. 11, 2023.
Nokia, "On intra-UE DL/UL prioritization for NR URLLC", 3GPP TSG RAN WG1 Meeting #96, Athens Greece, Feb. 25, 2019.
ZTE "UL inter-UE multiplexing between eMBB and URLLC", 3GPP TSG WG1 #97, Reno USA, 2019.
3GPP TS 38.331 V1.0.1 (Dec. 2017), 3rd Generation Partnership Project Technical Specification Group Radio Access Network, http://www.3gpp.org.
European Office Action for corresponding application 20 847 332.2; Report dated Jan. 15, 2025.
Huawei, HiSilicon, Discussion on UL multiplexing of eMBB and URLLC, 3GPP TSG RANWG1 Meeting #9 1, Reno, USA, Nov. 27th-Dec. 1, 2017, R1 17 1 9409.
Korean Office Action for corresponding application 10-2022-7006706; Report dated Feb. 24, 2025.

\* cited by examiner

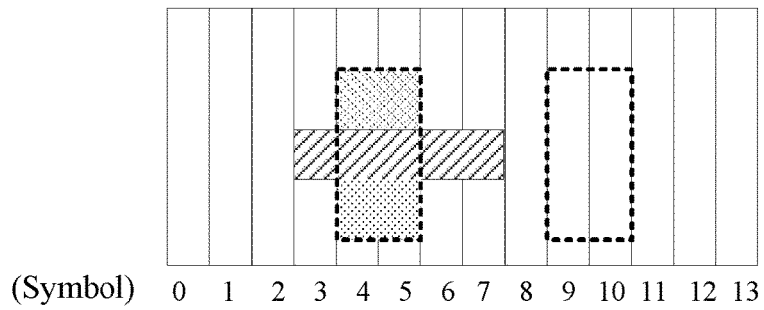
FIG. 4
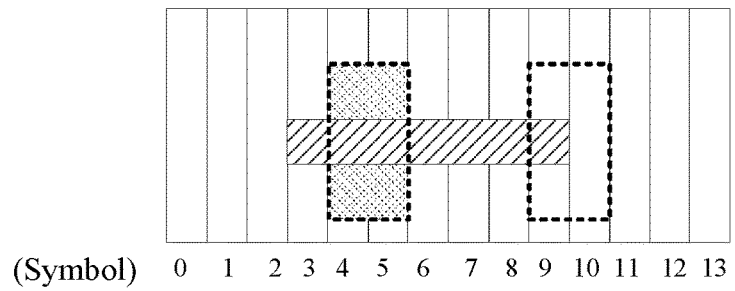
FIG. 5
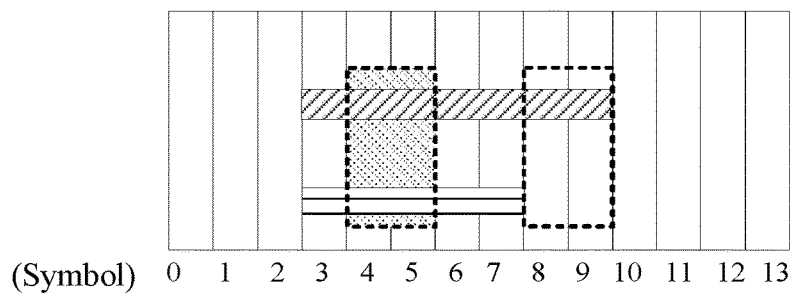
FIG. 6
Send downlink control information to a user terminal, where the downlink control information includes a resource indication domain, and the resource indication domain is configured to indicate a resource to the user terminal ~S110
Receive uplink transmission data sent by the user terminal according to the downlink control information ~S120
FIG. 7

US 12,376,116 B2

UPLINK TRANSMISSION METHOD AND APPARATUS, RESOURCE INDICATION METHOD AND APPARATUS, SERVING NODE, AND MEDIUM

CROSS REFERENCE TO RELATED APPLICATION

This is a national stage application filed under 37 U.S.C. 371 based on International Patent Application No. PCT/CN2020/105426, filed on Jul. 29, 2020, which claims priority to Chinese Patent Application No. 201910703649.2, filed with the China National Intellectual Property Administration (CNIPA) on Jul. 31, 2019, disclosure of which is incorporated herein by reference in its entirety.

TECHNICAL FIELD

The present application relates to wireless communication networks, and for example, an uplink transmission method and apparatus, a resource indication method and apparatus, a serving node, and a medium.

BACKGROUND

Uplink services in a wireless communication have different transmission time delays, different reliability and the like, so that the uplink services have different priorities, and services with higher priorities preempt a resource transmission of services with lower priorities. In a Grant free transmission, a user terminal may autonomously perform an uplink service transmission on a group of Grant free resources configured semi-statically, and in a case where an uplink transmission resource indicated by a serving node is overlapped with other transmission resources with lower priorities, the serving node cannot determine in advance on which candidate resource the uplink transmission will occur, preempted users cannot be notified in advance, and no effective flow and signaling are available to support an uplink service transmission in an uplink service multiplexing scenario, so that the communication efficiency and the reliability are relatively low.

SUMMARY

The present application provides an uplink transmission method and apparatus, a resource indication method and apparatus, a serving node and a medium, and the communication efficiency and the reliability are improved by determining an uplink transmission mechanism according to an indication resource.

An embodiment of the present application provides an uplink transmission method. The uplink transmission method includes the following, downlink control information (DCI) is received, where the downlink control information includes a resource indication domain; and an uplink transmission mechanism is determined according to an indication resource indicated by the resource indication domain.

An embodiment of the present application further provides a resource indication method. The resource indication method includes the following, downlink control information is sent to a user terminal, where the downlink control information includes a resource indication domain, and the resource indication domain is configured to indicate a resource to the user terminal; and uplink transmission data sent by the user terminal according to the downlink control information is received.

An embodiment of the present application further provides an uplink transmission apparatus. The uplink transmission apparatus includes a first receiving module and an uplink transmission module. The first receiving module is configured to receive downlink control information, where the downlink control information includes a resource indication domain. The plink transmission module is configured to determine an uplink transmission mechanism of a configured grant resource according to an indication resource indicated by the resource indication domain.

An embodiment of the present application further provides a resource indication apparatus. The resource indication apparatus includes a sending module and a receiving module. The sending module is configured to send downlink control information to a user terminal, where the downlink control information includes a resource indication domain, and the resource indication domain is configured to indicate a resource to the user terminal. The receiving module is configured to receive uplink transmission data sent by the user terminal according to the downlink control information.

An embodiment of the present application further provides a user terminal. The user terminal includes one or more processors and a storage apparatus configured to store one or more programs. The one or more programs, when executed by the one or more processors, cause the one or more processors to implement the uplink transmission method described above.

An embodiment of the present application further provides a serving node. The serving node includes one or more processors and a storage apparatus configured to store one or more programs. The one or more programs, when executed by the one or more processors, cause the one or more processors to implement the resource indication method described above.

An embodiment of the present application further provides a computer readable storage medium storing a computer program. The program, when executed by a processor, implements the uplink transmission method or the resource indication method described above.

BRIEF DESCRIPTION OF DRAWINGS

FIG. 4 is a schematic diagram of an indication resource being overlapped with at least one configured grant resource of at least two configured grant resources provided in an embodiment;

FIG. 5 is a schematic diagram of an indication resource being overlapped with at least two configured grant resources provided in an embodiment;

FIG. 6 is a schematic diagram of at least two groups of indication resources being overlapped with at least one configured grant resource of at least two configured grant resources provided in an embodiment;

FIG. 7 is a flowchart of a resource indication method provided in an embodiment;

DETAILED DESCRIPTION

Figure 1:
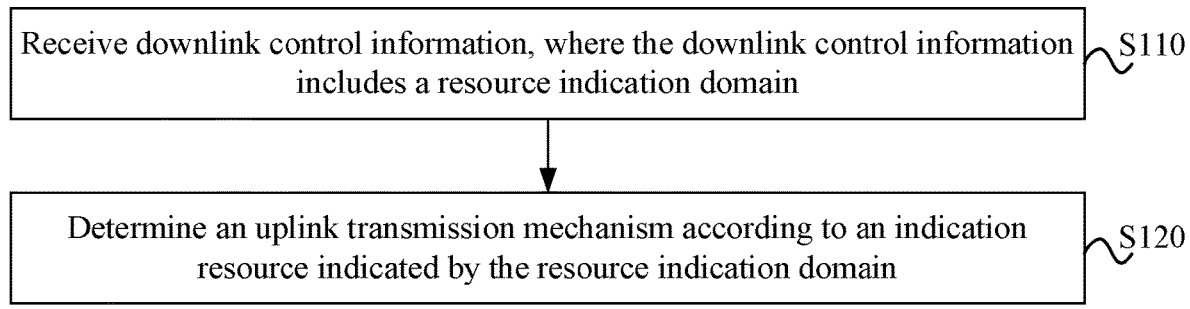
FIG. 1 is a flowchart of an uplink transmission method provided in an embodiment.

The present application will be described below in conjunction with the accompanying drawings and embodiments below. It should be understood that the specific embodiments described herein are merely illustrative of the present application and are not restrictive of the present application. It should be noted that the embodiments and features in the embodiments of the present application may be arbitrarily combined with each other without conflict. In addition, it should be noted that, for ease of description, only some, but not all, of the structures related to the present application are shown in the accompanying drawings.

In order to support a transmission with an ultra-high reliability and a ultra-low time delay, a service with a low time delay and a high reliability needs to be transmitted in relatively short transmission time, and meanwhile, part of resources may be preempted for transmission in a process that other services with relatively long transmission time are not transmitted or are being transmitted. Because different users of an uplink transmission are unclear to be preempted for transmission, indication information related to preempted resources needs to be informed to the users preempted for transmission in order to reduce the performance influence on the service with the high reliability and the low time delay as much as possible, and at this time, an uplink transmission of a service with a relatively long transmission time interval or a service with a lower reliability cancels transmission or stops transmission, so that the performance reduction caused by a simultaneous transmission of the service with the low time delay and the high reliability on a same resource is avoided. Currently, for a downlink service preemption transmission, 14 blocks are divided by {M, N}={14, 1} or {7, 2} in a configured reference downlink resource, and whether each block is preempted is notified through a bitmap, where M represents a number of blocks divided in a time domain, and N represents a number of blocks divided in a frequency domain. For a preemption transmission of the uplink service, an effective indication manner does not exist.

The uplink transmission includes two types: a grant based uplink transmission and a grant free uplink transmission, the grant based uplink transmission refers to an uplink service transmission performed by a user according to an uplink grant of a serving node, and a transmission resource of the grant based uplink transmission is determined; and the grant free uplink transmission refers to an uplink service transmission autonomously selected by the user on a group of grant free resources configured semi-statically. For this type of transmission, the serving node cannot pre-determine on which candidate resource a particular transmission takes place. Therefore, when the grant free uplink transmission is overlapped with other transmission resources with a low priority, the base station cannot notify the preempted user in advance, and the preemption indication-based coexistence solution is no longer applicable. According to this embodiment, a power control is used as a feasible scheme, and the basic idea is to dynamically control transmitting power of the grant free uplink transmission when the other transmission resources with the low priority are overlapped with the grant free uplink transmission resource, so that a process and a signaling format for realizing the power control are provided, and thus the performance of the grant free transmission is improved.

FIG. 1 is a flowchart of an uplink transmission method provided in an embodiment. As shown in FIG. 1, the uplink transmission method provided in this embodiment is applied to a user terminal and includes the following.

In S110, downlink control information is received, where the downlink control information includes a resource indication domain.

In this embodiment, the downlink control information is sent by a serving node to the user terminal and is configured to indicate a transmission resource of a dynamic grant service as a basis for determining an uplink transmission mechanism of a configured grant (CG) service. The user terminal selects a transmission resource of an uplink service according to an overlapping condition of an indication resource indicated by the downlink control information and the CG resource, and when the selected transmission resource is overlapped with the indication resource, an uplink transmission based on a rate matching or a power control is performed. An indication resource indicated in the downlink control information may not be completely identical to a transmission resource of the dynamic grant service, for example, due to a resource indication overhead, an indication granularity of the downlink control information to the indication resource is greater than an indication granularity of the uplink grant to the transmission resource of the dynamic grant service; or, indication resources are not completely the same due to different resource indication manners. The serving node is a base station.

In S120, an uplink transmission mechanism is determined according to an indication resource indicated by the resource indication domain.

In an embodiment, the downlink control information includes at least one resource indication domain, each of the at least one resource indication domain is configured to indicate a group of indication resources, and different groups of indication resources correspond to different power control parameters.

A mapping relationship between the indication resource and the power control parameter may be predefined by a protocol, or may be configured by a broadcast message, user-specific radio resource control (User Equipment Specific Radio Resource Control) signaling, or the like. For example, each resource indication domain is configured to indicate a group of indicating resources, each resource indication domain corresponds to one resource group, and a numbering of the resource group corresponds to the resource indication domain. For example, an Nth resource indication domain corresponds to a resource group N, that is, an occupied transmission resource indicated in the Nth resource indication domain belongs to the resource group N, and the resource group N corresponds to a set of power control parameters.

In an embodiment, that the uplink transmission mechanism is determined includes at least one of: a target resource for transmitting uplink data is determined from the at least two CG resources in a case where there are at least two CG resources overlapped with the indication resource; a transmitting power for transmitting uplink data on the target resource is increased; or an uplink data transmission of a rate matching on the indication resource is performed within the target resource.

In an embodiment, the uplink transmission mechanism includes: an uplink transmission mechanism of a rate matching and an uplink transmission mechanism of a power control. The uplink transmission mechanism of a rate matching means that when the CG resource is overlapped with at least one group of indication resources, an uplink data transmission of a rate matching on the indication resource is performed within the CG resource. The uplink transmission mechanism of a power control means that when the CG resource is overlapped with at least one group of indication resources, a transmitting power of an uplink transmission on the CG resource is increased based on a power control parameter corresponding to the indication resource. In this embodiment, for the grant free uplink transmission of the user terminal, the user terminal is pre-configured with multiple CG resources. In a case where the uplink service arrives, the user terminal selects one CG resource among the multiple CG resources for the uplink transmission according to the indication resource in the downlink control information, and determines the uplink transmission mechanism, so as to implement the multiplexing of the uplink transmission resource.

Figure 2:
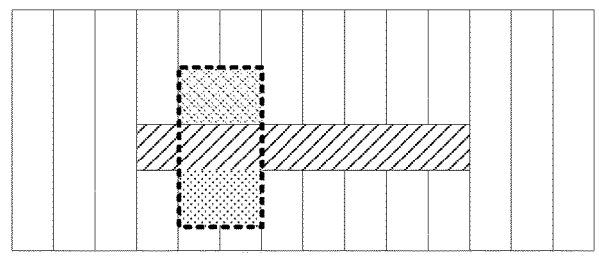
FIG. 2 is a schematic diagram of an indication resource being overlapped with a configured grant resource provided in an embodiment.

FIG. 2 is a schematic diagram of an indication resource being overlapped with a configured grant resource provided in an embodiment. As shown in FIG. 2, within a predefined reference uplink resource (RUR), an indication resource (a slash region within a solid box) in a DCI is overlapped with a CG resource (a region within a dashed box). The user terminal determines an uplink transmission mechanism according to the indication resource of the DCI, the uplink transmission mechanism includes a rate matching manner and a power control manner. The rate matching manner means that uplink data is transmitted by using a non-overlapped part of the CG resource and the indication resource, and the uplink data is not mapped for the overlapped part; therefore, the transmission resource is reduced, and a code rate of the uplink transmission is increased. The power control is to improve the transmitting power for transmitting the uplink service on the CG resource according to the control power parameter corresponding to the indication resource in the DCI, so that the reliable transmission of a service with a relatively high priority is achieved.

In an embodiment, that an uplink transmission mechanism is determined according to an indication resource indicated by the resource indication domain includes: an uplink transmission mechanism of a configured grant resource is determined based on the indication resource according to a relationship between a modulation and coding scheme level (MCS) and a first threshold value. In this embodiment, the user terminal determines an adopted uplink transmission mechanism according to the configured MCS level, i.e., an uplink transmission mechanism of a rate matching or an uplink transmission mechanism of a power control.

In an embodiment, in a case where the MCS level is greater than or equal to the first threshold value, an uplink data transmission of a rate matching on the indication resource is performed within the CG resource, and uplink data is not mapped in an overlapping region; and in a case where the MCS level is less than the first threshold value, transmitting power of an uplink transmission on the CG resource is increased according to a power control parameter corresponding to an indication resource overlapped with the CG resource.

In this embodiment, the first threshold value may be predefined by the protocol or may be notified to the user terminal by the serving node. Exemplarily, the first threshold value is MCS 8, if the MCS level configured by the user terminal for the uplink transmission in the CG resource is MCS 6 and is less than the first threshold value, then transmitting power of an uplink transmission of the CG resource is increased according to a power control parameter corresponding to the indication resource; if the MCS level configured by the user terminal for the uplink transmission in the CG resource is MCS 10, then the uplink data transmission of the rate matching is performed on the CG resource, that is, the uplink data is transmitted in a non-overlapping region of the indication resource and the CG resource, in this cases, the uplink data is not mapped in the overlapping region, the transmission resource is reduced, and the code rate of the uplink transmission is increased. In this embodiment, in a case where the MCS level is equal to the first threshold value, the uplink transmission mechanism of the rate matching is adopted.

In an embodiment, in a case where the MCS level is greater than the first threshold value, the uplink data transmission of the rate mating on the indication resource is performed within the CG resource, and the uplink data is not mapped in the overlapping region; and in a case where the MCS level is less than or equal to the first threshold value, transmitting power of an uplink transmission on the CG resource is increased according to a power control parameter corresponding to an indication resource overlapped with the CG resource. In this embodiment, in a case where the MCS level is equal to the first threshold value, the uplink transmission mechanism for performing the power control is adopted.

In an embodiment, that the uplink transmission mechanism is determined according to the indication resource indicated by the resource indication domain includes: a first code rate adopted in a case where the uplink data transmission of the rate matching on the indication resource is performed within the CG resource is calculated; and an uplink transmission mechanism of the configured grant resource is determined according to a relationship between the first code rate and a second threshold value.

In an embodiment, in a case where the first code rate is greater than or equal to the second threshold value, the transmitting power of the uplink transmission on the CG resource is increased according to the power control parameter corresponding to the indication resource overlapped with the configured grant resource; and in a case where the first code rate is less than the second threshold value, the uplink data transmission of the rate matching on the indication resource is performed within the CG resource.

In this embodiment, in a case where the CG resource is overlapped with the indication resource, a first code rate needing to be adopted in a case where the uplink transmission mechanism of the rate matching is adopted is firstly calculated, and in a case where the first code rate is greater than or equal to the second threshold value, the transmitting power of the uplink transmission on the CG resource is increased according to the power control parameter corresponding to the indication resource overlapped with the configured grant resource, so that a problem that the reliability of the transmission does not meet the requirement due to a fact that the code rate for adopting the uplink transmission mechanism for performing the rate matching is too high is avoided; and in a case where the first code rate is less than the second threshold value, the uplink data transmission of the rate matching is performed, and the uplink data is not mapped in the overlapping region, so as to reduce the transmission resource and increase the code rate. In this embodiment, in a case where the first code rate is equal to the second threshold value, the uplink transmission mechanism of the power control is adopted.

In an embodiment, in a case where the first code rate is greater than the second threshold value, transmitting power of an uplink transmission on the CG resource is increased according to a power control parameter corresponding to an indication resource overlapped with the CG resource; and in a case where the first code rate is less than or equal to a second threshold value, the uplink data transmission of the rate mating on the indication resource is performed within the CG resource, and the uplink data is not mapped in the overlapping region. In this embodiment, in a case where the first code rate is equal to the second threshold value, the uplink transmission mechanism of the rate matching is adopted.

Figure 3:
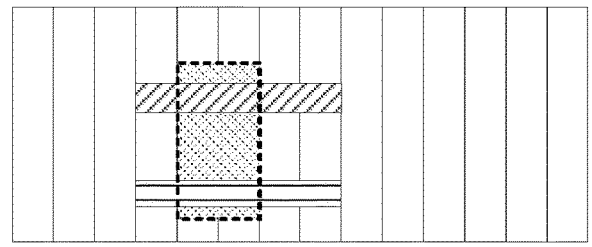
FIG. 3 is a schematic diagram of at least two groups of indication resources being overlapped with a configured grant resource provided in an embodiment.

FIG. 3 is a schematic diagram of at least two groups of indication resources being overlapped with a configured grant resource provided in an embodiment. As shown in FIG. 3, an example in which the CG resource (a region within a dashed box) is overlapped with two groups of indication resources (a first group of indication resources are represented by a slash region within a solid box and a second group of indication resources are represented by a horizontal region within a solid box) is used, the first group of indication resources correspond to a power control parameter 1, and the second group of indication resources correspond to a power control parameter 2. The user terminal determines an uplink transmission mechanism according to the relationship between the configured MCS level and the first threshold value or the relationship between the first code rate and the second threshold value, and performs an uplink transmission of a power control or a rate matching on the CG resource. In this embodiment, in a process of calculating a first code rate adopted by the uplink data transmission of the rate matching within the CG resource, uplink data is not mapped in overlapping regions of the CG resource and the two groups of indication resources.

In an embodiment, that the uplink transmission mechanism is determined according to the indication resource indicated by the resource indication domain includes: in a case where a configured grant resource is overlapped with at least two groups of indication resources, transmitting power of an uplink transmission on the configured grant resource is increased according to a maximum power adjustment amount in at least two power control parameters corresponding to the at least two groups of indication resources. In this embodiment, the uplink transmission mechanism determined by the user terminal is a mechanism based on the power control, and two groups of indication resources respectively correspond to different power control parameters.

In an embodiment, the user terminal increases transmitting power of an uplink transmission on the CG resource according to a maximum power adjustment amount in power control parameters corresponding to the at least two groups of indication resources, for example, a power adjustment amount in power control parameters corresponding to the first group of indication resources is P1, and a power adjustment amount in power control parameters corresponding to the second group of indication resources is P2, and P2 is greater than P1, then the transmitting power of the uplink transmission on the CG resource is increased according to the power control parameters corresponding to the second group of indication resources, and the transmitting power of the uplink transmission on the CG resource is increased by P2.

In an embodiment, that the uplink transmission mechanism of the configured grant resource is determined according to the indication resource indicated by the resource indication domain includes: in a case where a CG resource is overlapped with at least one group of indication resources, and a number of the CG resources is at least two, a target resource is determined in the CG resource according to the indication resource; and determining an uplink transmission mechanism on the target resource is determined.

In an embodiment, the target resource includes a configured grant resource having no overlap with the indication resource or a configured grant resource having a most non-overlap region with the indication resource.

FIG. 4 is a schematic diagram of an indication resource being overlapped with at least one configured grant resource of at least two configured grant resources provided in an embodiment. In the embodiment, a number of CG resources is at least two. As shown in FIG. 4, two CG resources (a first CG resource is a region within a dashed box on symbols 4 and 5, and a second CG resource is a region within the dashed box on symbols 9 and 10) are used as an example, the indication resource is overlapped with the first CG resource and is not overlapped with the second CG resource. The user terminal may preferentially select a CG resource (i.e., a resource which is not indicated in the DCI, or a CG resource which is not occupied) which is not overlapped with the indication resource, and the second CG resource is used as a target resource and determines an uplink transmission mechanism on the target resource.

FIG. 5 is a schematic diagram of an indication resource being overlapped with at least two configured grant resources provided in an embodiment. In this embodiment, a number of CG resources is at least two. As shown in FIG. 5, two CG resources (a first CG resource is a region within a dashed box on symbols 4 and 5, and a second CG resource is a region within the dashed box on symbols 9 and 10) are used as an example, the indication resource is overlapped with the two CG resources, the user terminal may preferentially select a CG resource with a least overlapping region with the indication resource (i.e., the CG resource with the most residual resources or the most non-overlapping region), and the second CG resource is used as a target resource and determines the uplink transmission mechanism on the target resource.

FIG. 6 is a schematic diagram of at least two groups of indication resources being overlapped with at least one configured grant resource of at least two configured grant resources provided in an embodiment. In this embodiment, a number of CG resources is at least two, and a number of indication resources is at least two. As shown in FIG. 6, two CG resources (a first CG resource is a region within a dashed box on symbols 4 and 5, and a second CG resource is a region within the dashed box on symbols 9 and 10), and two groups of indication resources (a first group of indication resources is a diagonal region within a solid box, and a second set of indication resources is a horizontal region within the solid box) are used as examples. The user terminal may preferentially select a CG resource (such as, the second CG resource in FIG. 6) with a least overlapping region with each indication resource as a target resource, and determine an uplink transmission mechanism on the target resource.

In an embodiment, the uplink transmission mechanism on the target resource includes that: an uplink data transmission of a rate matching on the indication resource within the target resource; or transmitting power of an uplink transmission on the target resource is increased based on a power control parameter corresponding to the indication resource. The uplink transmission mechanism on the target resource may be determined according to a relationship between a configured MCS level and a third threshold value, and may also be determined according to a relationship between a second code rate and a fourth threshold value.

In an embodiment, that the uplink transmission mechanism on the target resource is determined includes: the uplink transmission mechanism on the target resource is determined according to a relationship between a MCS level and the third threshold value.

In an embodiment, in a case where the MCS level is greater than or equal to the third threshold value, an uplink data transmission of a rate matching on the indication resource is performed within the target resource, and uplink data is not mapped in the overlapping region; and in a case where the MCS level is less than the third threshold value, transmitting power of an uplink transmission on the target resource is increased according to a power control parameter corresponding to an indication resource overlapped with the target resource.

In this embodiment, the third threshold value is predefined by the protocol or is notified to the user terminal by a serving node. If a MCS level configured by the user terminal for an uplink transmission within the target resource is less than the third threshold value, then transmitting power of the uplink transmission of the target resource is increased according to a power control parameter corresponding to the indication resource; if a MCS level configured by the user terminal for an uplink transmission within the target resource is greater than or equal to the third threshold value, then an uplink transmission of a rate matching on the indication resource is performed within the target resource, that is, uplink data is transmitted in a non-overlapping region of the indication resource and the target resource, and in this case, the uplink data is not mapped in the overlapping region, and a transmission resource is reduced, so that a code rate of the uplink transmission is improved. In this embodiment, in a case where the MCS level is equal to the third threshold value, an uplink transmission mechanism of a rate matching is adopted.

In an embodiment, in a case where the MCS level is greater than the third threshold value, an uplink data transmission of a rate matching on the indication resource is performed within the target resource, and uplink data is not mapped in the overlapping region; and in a case where the MCS level is less than or equal to the third threshold value, transmitting power of an uplink transmission on the target resource is increased according to a power control parameter corresponding to an indication resource overlapped with the target resource. In this embodiment, in a case where the MCS level is equal to the third threshold value, an uplink transmission mechanism for performing a power control is adopted.

In an embodiment, that the uplink transmission mechanism on the target resource is determined includes the following: a second code rate adopted in a case where the uplink data transmission of the rate matching on the indication resource is performed within the target resource is calculated; and the uplink transmission mechanism on the target resource is determined according to a relationship between the second code rate and a fourth threshold value.

In an embodiment, in a case where the second code rate is greater than or equal to the fourth threshold value, transmitting power of an uplink transmission on the target resource is increased according to a power control parameter corresponding to an indication resource overlapped with the target resource; and in a case where the second code rate is less than or equal to the fourth threshold value, an uplink data transmission of a rate matching on the indication resource is performed within the target resource, and uplink data is not mapped in the overlapping region.

In this embodiment, the target resource is overlapped with the indication resource, a second code rate needing to be adopted for the target resource if the target resource adopts the uplink transmission mechanism of the rate matching is firstly calculated, and in a case where the second code rate is greater than or equal to the fourth threshold value, the transmitting power of the uplink transmission on the target resource is increased according to the power control parameter corresponding to the indication resource, so that a problem that the reliability of the transmission does not meet the requirement due to a fact that the code rate for adopting the uplink transmission mechanism of the rate matching is too high is avoided; and in a case where the first code rate is less than the second threshold value, the uplink data transmission of the rate matching on the indication resource is performed in the target resource, and the uplink data is not mapped in the overlapping region, so as to reduce the transmission resource and increase the code rate. In this embodiment, in a case where the second code rate is equal to the fourth threshold value, the uplink transmission mechanism for performing the power control is adopted.

In an embodiment, in a case where the second code rate is greater than the fourth threshold value, transmitting power of an uplink transmission on the target resource is increased according to a power control parameter corresponding to an indication resource overlapped with the target resource; and in a case where the second code rate is less than or equal to the fourth threshold value, an uplink data transmission of a rate matching on the indication resource is performed within the target resource, and uplink data is not mapped in the overlapping region. In this embodiment, in a case where the second code rate is equal to the fourth threshold value, the uplink transmission mechanism of the rate matching is adopted.

In an embodiment, the uplink transmission mechanism specified by the protocol or configured by the serving node is the uplink transmission mechanism of the rate matching or the uplink transmission mechanism of the power control, and the user terminal performs the uplink transmission on the target resource according to the uplink transmission mechanism specified by the protocol or configured by the serving node.

In an embodiment, that the uplink transmission mechanism on the target resource is determined includes: in a case where the target resource is overlapped with at least two groups of indication resources, transmitting power of an uplink transmission on the target resource is increased according to a maximum power adjustment amount in power control parameters corresponding to the at least two groups of indication resources.

In the embodiment, the uplink transmission mechanism determined by the user terminal is a mechanism based on the power control, and two groups of indication resources respectively correspond to different power control parameters.

In an embodiment, the user terminal increases transmitting power of an uplink transmission on the configured grant resource according to the maximum power adjustment amount in the power control parameters corresponding to the at least two groups of indication resources, for example, a power adjustment amount required for adjusting the transmission power to power control parameters corresponding to the first group of indication resources is P3, a power adjustment amount required for adjusting the transmission power to power control parameters corresponding to the second group of indication resources is P4, and P4 is greater than P3, then the transmitting power of the target resource is increased according to P4 and increased by P4

According to the above embodiments, the uplink transmission mechanism of the CG resource is determined according to the indication resource indicated in the downlink control information, the uplink transmission resource is reused in a power control or rate matching manner, the transmission efficiency of an uplink transmission service with a high priority is effectively guaranteed, and the communication efficiency and the reliability are improved.

An embodiment of the present application further provides a resource indication method. FIG. 7 is a flowchart of a resource indication method provided in an embodiment. As shown in FIG. 7, the resource indication method provided in this embodiment may be applied to a serving node, and includes the following.

In S210, downlink control information is sent to a user terminal, where the downlink control information includes a resource indication domain, and the resource indication domain is configured to indicate a resource to the user terminal.

According to this embodiment, the resource is indicated to the user terminal through the DCI, and the user terminal determines an uplink transmission mechanism according to an indication resource indicated by the DCI in a case where an indication resource indicated by the resource indication domain in the DCI is overlapped with a CG resource of the user terminal.

In S220, uplink transmission data sent by the user terminal according to the downlink control information is received.

In an embodiment, the downlink control information includes at least one resource indication domain, each resource indication domain indicates a group of indication resources; and different groups of indication resources correspond to different power control parameters.

Figure 8:
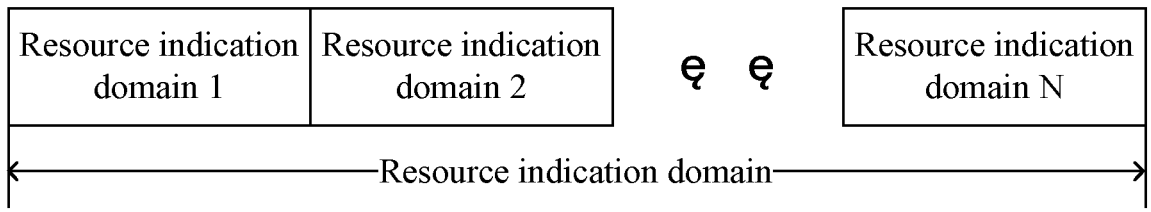
FIG. 8 is a schematic diagram of a resource indication domain in downlink control information provided in an embodiment.

FIG. 8 is a schematic diagram of a resource indication domain in downlink control information provided in an embodiment. As shown in FIG. 8, at least one resource indication domain is included in the DCI, each resource indication domain may indicate a group of resources, each resource indication domain corresponds to one resource group, and a numbering of the resource group corresponds to the resource indication domain. For example, a Nth resource indication domain corresponds to a resource group N, i.e. resources indicated within the Nth resource indication domain belong to the resource group N.

TABLE 1

| mapping relationship table of resource indication domain and numbering of resource group | |
|---|---|
| Resource indication domain | Numbering of resource group |
| resource indication domain 1 | resource group 1 |
| resource indication domain 2 | resource group 2 |
| resource indication domain 3 | resource group 3 |
| resource indication domain 4 | resource group 4 |

Table 1 is a mapping relationship table of the resource indication domain and the numbering of the resource group. As shown in Table 1, each resource indication domain corresponds to one resource group.

A number of resource indication domains in this embodiment is related to a number of resource groups. For example, if the system predefines 4 resource groups, or the base station configures 4 resource groups for a user terminal through high-layer signaling, then a number of resource indication domains in the DCI is also defined as 4, and the overhead of information bits in the DCI is determined as a number of bits per resource indication domain multiplied by 4.

Figure 9:
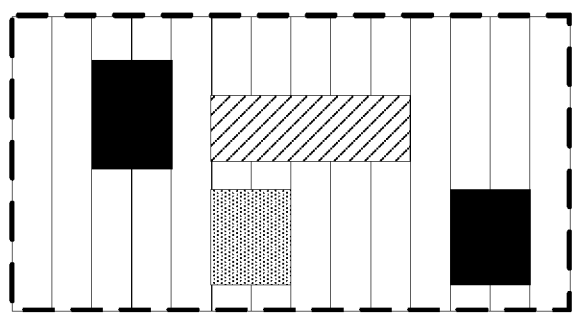
FIG. 9 is a schematic diagram of a time-frequency domain resource to be indicated provided in an embodiment.

FIG. 9 is a schematic diagram of a time-frequency domain resource to be indicated provided in an embodiment. As shown in FIG. 9, a region of a dashed box is a target time-frequency resource range indicated by the DCI, which may also be referred to as a reference uplink resource (RUR), where a region shown by a black box (two black box regions in FIG. 9) is a resource in a resource group 1, a region shown by a slash box is a resource in a resource group 2, a region shown by a dotted box is a resource in a resource group 4, and the above resource is a time-frequency domain resource to be indicated within the RUR.

In an embodiment, a time-frequency domain resource contained within a corresponding resource group is indicated within each resource indication domain, for example, one or more resources within a resource group are jointly indicated by using time domain resource allocation and frequency domain resource allocation. The resource to be indicated in FIG. 9 is used as an example, the resource indication domain 1, the resource indication domain 2 and the resource indication domain 4 in the DCI are respectively used for indicating a resource in the resource group 1, a resource in the resource group 2 and a resource in the resource group 4. Within the RUR in FIG. 9, there are no resources within a resource group 3, exemplarily, all bits of a resource indication domain 3 may be set to a predefined value, for example, all bits of a resource indication domain 3 is set to 0, which indicates that no resources within the resource group 3 exist within the RUR.

In an embodiment, the resource indication domain is configured to indicate an indication resource contained within a resource group corresponding to the resource indication domain based on a bitmap. In this embodiment, resources within the RUR are numbered in advance, a numbering of a resource contained in a corresponding resource group is indicated within each resource indication domain.

Figure 10:
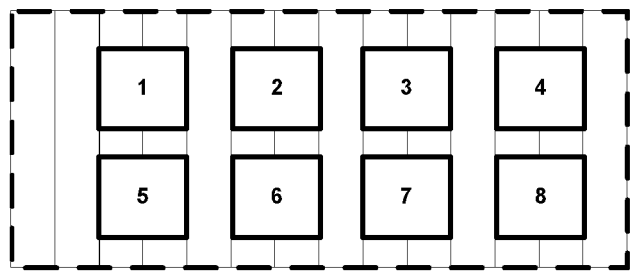
FIG. 10 is a schematic diagram of a numbering of a resource to be indicated provided in an embodiment.

FIG. 10 is a schematic diagram of a numbering of a resource to be indicated provided in an embodiment. As shown in FIG. 10, 8 resources to be indicated are contained within the RUR, and an indication resource contained in a corresponding resource group is indicated based on a bitmap.

For example, a bitmap of a resource indication domain 1 is 10010000, each bit represents whether a corresponding resource belongs to a resource group 1, where 1 represents belongs and 0 represents does not belong, then resource 1 and the resource 4 in this example belong to the resource group 1; a bitmap of a resource indication domain 2 is 00001000, which indicates that a resource 5 belongs to a resource group 2; a bitmap of a resource indication domain 3 is 01100001, which indicates that a resource 2, a resource 3 and a resource 8 belong to a resource group 3; a bitmap of a resource indication domain 4 is 00000000, which indicated that no resources within a current RUR belong to a resource group 4. In this embodiment, a resource that does not belong to any resource group within a RUR region may be understood as an uplink transmission resource that does not require a power control.

In an embodiment, a mapping relationship exists between the resource group and a power control parameter, and the power control parameter includes at least one of an open-loop power control parameter or a closed-loop power control parameter.

In the embodiment, each resource group corresponds to a set of power control parameters, and the user terminal determines an uplink transmission mechanism according to a power control parameter corresponding to the resource group in a case where CG resources of the user terminal are overlapped with resources in a resource group indicated by a serving node. The power control parameter include at least one of an open-loop power control parameter (such as target receiving power P0, a path loss compensation coefficient $\alpha$) or a closed-loop power control parameter (such as a closed-loop power adjustment amount).

Table 2 is a mapping relationship table of the resource group and the power control parameter. As shown in Table 2, each resource group corresponds to a set of power control parameters, and the power control parameter uses the open-loop power control parameter as an example. In this embodiment, the resource groups are distinguished through numbering of the resource group, and a mapping relationship between the resource group and the power control parameter is a mapping relationship between the numbering of the resource group and the power control parameter. Specific resources contained within each resource group are indicated in the downlink control information.

TABLE 2 mapping relationship table of resource group
and power control parameter

| Numbering of resource group | Power control parameter |
| --- | --- |
| resource group 1 | P0 = −106 dBm, $\alpha$ = 1 |
| resource group 2 | P0 = −100 dBm, $\alpha$ = 1 |
| resource group 3 | P0 = −94 dBm, $\alpha$ = 1 |
| resource group 4 | P0 = −88 dBm, $\alpha$ = 1 |

In an embodiment, a mapping relationship between the resource group and the power control parameter is pre-defined by a protocol, for example, a mapping relationship as shown in Table 2 is predefined by a protocol, in this case, a value of a power control parameter corresponding to a numbering of each resource group is fixed, and the above mapping relationship is the same for all user terminals.

In an embodiment, a mapping relationship between the resource group and the power control parameter is configured by a broadcast message. In this case, the above mapping relationship is also the same for all user terminals, but a value of the power control parameter may be configured, for example, the power control parameter P0 corresponding to the resource group 1 may be configured to a value other than −106 dBm.

In an embodiment, the mapping relationship between the resource group and the power control parameter is configured by user equipment specific radio resource control signaling or user equipment group specific radio resource control signaling. In this embodiment, radio resource control (RRC) signaling may be oriented to one user equipment (UE), and the mapping relationship between the numbering of the resource group and the power control parameter may be different for different UEs; RRC signaling may also be oriented to a group of UEs and belong to different groups of UEs, and the mapping relationship between the numbering of the resource group and the power control parameter may be different.

Table 3 is another mapping relationship table of the resource group and the power control parameter. The RRC signaling towards the UE is used as an example, for a UE1, the mapping relationship table shown in Table 2 is configured, and for a UE2, the mapping relationship table shown in Table 3 is configured, and the mapping relationships configured for the two UEs are different.

TABLE 3 another mapping relationship table of resource
group and power control parameter

| Numbering of resource group | Power control parameter |
| --- | --- |
| resource group 1 | P0 = −100 dBm, $\alpha$ = 1 |
| resource group 2 | P0 = −97 dBm, $\alpha$ = 1 |
| resource group 3 | P0 = −94 dBm, $\alpha$ = 1 |
| resource group 4 | P0 = −91 dBm, $\alpha$ = 1 |

In an embodiment, in a case of adopting the mapping relationship configured by the user group specific radio resource control signaling, the UE is grouped according to certain characteristics, for example, UEs are grouped according to the MCS configured by the UE uplink transmission, and UEs in a same MCS level interval may be defined in a same user group. The MCS level interval may be protocol predefined. For example, MCS 0-3 is a same MCS level interval, MCS 4~8 is one MCS level interval, MCS 9~12 is one MCS level interval, and MCS 13 and above are defined as one MCS level interval.

In an embodiment, the mapping relationship between the resource group and the power control parameter is jointly configured by the RRC signaling and media access control (MAC) layer signaling, the radio resource control signaling is configured to configure a power control parameter pool, the MAC layer signaling is configured to configure a mapping relationship between the power control parameter and the resource group, and the power control parameter is a subset selected in the power control parameter pool.

TABLE 4 another mapping relationship table of resource
group and power control parameter

| Numbering of resource group | Power control parameter |
| --- | --- |
| resource group 1 | power control parameter 2 |
| resource group 2 | power control parameter 5 |
| resource group 3 | power control parameter 9 |
| resource group 4 | power control parameter 13 |

Table 4 is another mapping relationship table of the resource group and the power control parameter. In this embodiment, one power control parameter pool is configured through the RRC signaling, a subset is selected in the power control parameter pool through the MAC layer signaling to serve as a configurable power control parameter, and a mapping relationship is established between the power control parameter pool and a resource group. For example, the power control parameter pool contains 16 groups of power control parameters, the 16 groups of power control parameters are respectively numbered as power control parameters 1~16; the MAC layer signaling selects a configurable power control parameter among the 16 sets of power control parameters, for example, 4 sets of power control parameters: 0100 1000 1000 1000, i.e., a power control parameter 2, a power control parameter 5, a power control parameter 9, a power control parameter 13 are selected by a 16 bit bitmap, and the mapping relationship between the resource group and the power control parameter is shown in Table 4.

According to the above embodiments, the mapping relationship between the resource group and the power control parameter is defined, and the resource is indicated to the user terminal through the downlink control information, so that the reuse of the uplink transmission resource among the user terminals through a power control or rate matching manner is effectively supported, the transmission efficiency of an uplink transmission service with a high priority is effectively guaranteed, and the communication efficiency and the reliability are improved.

Figure 11:
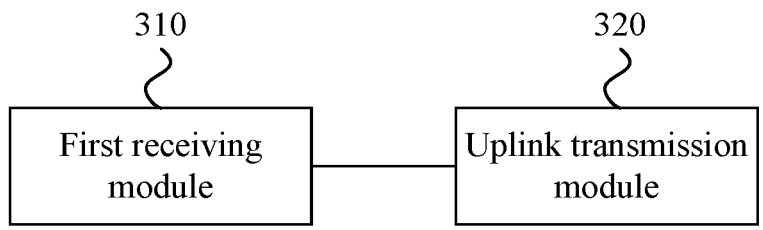
FIG. 11 is a schematic structural diagram of an uplink transmission apparatus provided in an embodiment.

An embodiment of the present application further provides an uplink transmission apparatus. FIG. 11 is a schematic structural diagram of an uplink transmission apparatus provided in an embodiment. As shown in FIG. 11, the apparatus includes a first receiving module 310 and an uplink transmission module 320. The first receiving module 310 is configured to receive downlink control information, where the downlink control information includes a resource indication domain. The uplink transmission module 320 is configured to determine an uplink transmission mechanism of a configured grant resource according to an indication resource indicated by the resource indication domain.

In an embodiment, the downlink control information includes at least one resource indication domain, each of the at least one resource indication domain indicates a group of indication resources; and different groups of indication resources correspond to different power control parameters.

In an embodiment, the uplink transmission mechanism includes that: in a case where a configured grant resource is overlapped with at least one group of indication resources, an uplink data transmission of a rate matching on the indication resource is performed within the configured grant resource; or in a case where a configured grant resource is overlapped with at least one group of indication resources, transmitting power of an uplink transmission on the configured grant resource is increased based on a power control parameter corresponding to the indication resource.

In an embodiment, the uplink transmission module 320 is specifically configured to determine an uplink transmission mechanism of a configured grant resource based on the indication resource according to a relationship between a modulation and coding scheme level and a first threshold value.

In an embodiment, the uplink transmission module 320 is specifically configured to: perform, within the configured grant resource, an uplink data transmission of a rate matching on the indication resource in a case where the modulation and coding scheme level is greater than or equal to the first threshold value; and increase transmitting power of an uplink transmission on the configured grant resource according to a power control parameter corresponding to an indication resource overlapped with the configured grant resource in a case where the modulation and coding scheme level is less than the first threshold value.

In an embodiment, the uplink transmission module 320 is specifically configured to: calculate a first code rate adopted in a case where the uplink data transmission of the rate matching on the indication resource is performed within the configured grant resource; and determine an uplink transmission mechanism of the configured grant resource according to a relationship between the first code rate and a second threshold value.

In an embodiment, the uplink transmission module 320 is specifically configured to: increase the transmitting power of the uplink transmission on the configured grant resource according to the power control parameter corresponding to the indication resource overlapped with the configured grant resource in a case where the first code rate is greater than or equal to the second threshold value; and perform the uplink data transmission of the rate matching on the indication resource within the configured grant resource in a case where the first code rate is less than the second threshold value.

In an embodiment, the uplink transmission module 320 is specifically configured to increase transmitting power of an uplink transmission on the configured grant resource according to a maximum power adjustment amount in at least two power control parameters corresponding to the at least two groups of indication resources in a case where a configured grant resource is overlapped with at least two groups of indication resources.

In an embodiment, the uplink transmission module 320 includes a target resource determination unit and an uplink transmission unit. The target resource determination unit is configured to determine a target resource in the configured grant resources according to the indication resource in a case where a configured grant resource is overlapped with at least one group of indication resources, and a number of the configured grant resources is at least two. The uplink transmission unit is configured to determine an uplink transmission mechanism on the target resource.

In an embodiment, the uplink transmission mechanism includes that: an uplink data transmission of a rate matching on the indication resource is performed within the target resource; or increasing transmitting power of an uplink transmission on the target resource based on a power control parameter corresponding to the indication resource.

In an embodiment, the target resource includes a configured grant resource having no overlap with the indication resource or a configured grant resource having a most non-overlap region with the indication resource.

In an embodiment, the uplink transmission unit is specifically configured to determine the uplink transmission mechanism on the target resource according to a relationship between a modulation and coding scheme level and a third threshold value.

In an embodiment, the uplink transmission unit is specifically configured to perform the uplink data transmission of the rate matching on the indication resource within the target resource in a case where the modulation and coding scheme is greater than or equal to a third threshold value; and increase the transmitting power of the uplink transmission on the target resource according to a power control parameter corresponding to an indication resource overlapped with the target resource in a case where the modulation and coding scheme is less than the third threshold value.

In an embodiment, the uplink transmission unit is specifically configured to: calculate a second code rate adopted in a case where the uplink data transmission of the rate matching on the indication resource is performed within the target resource; and determine the uplink transmission mechanism on the target resource according to a relationship between the second code rate and a fourth threshold value.

In an embodiment, the uplink transmission unit is specifically configured to: increase the transmitting power of the uplink transmission on the target resource according to a power control parameter corresponding to an indication resource overlapped with the target resource in a case where the second code rate is greater than or equal to the fourth threshold value; and, perform the uplink data transmission of the rate matching on the indication resource within the target resource in a case where the second code rate is less than or equal to the fourth threshold value.

In an embodiment, the uplink transmission unit is specifically configured to increase transmitting power of an uplink transmission on the target resource according to a maximum power adjustment amount in at least two power control parameters corresponding to the at least two groups of indication resources in a case where the target resource is overlapped with at least two groups of indication resources.

Figure 12:
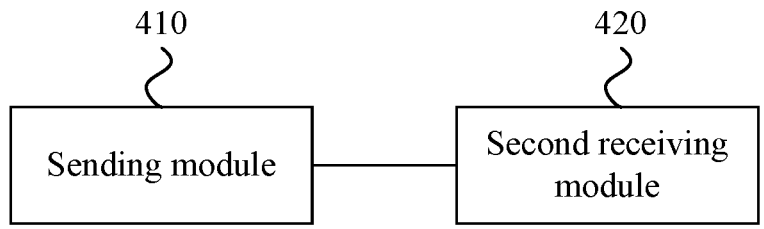
FIG. 12 is a schematic structural diagram of a resource indication apparatus provided in an embodiment.

An embodiment of the present application further provides a resource indication apparatus. FIG. 12 is a schematic structural diagram of a resource indication apparatus provided in an embodiment. As shown in FIG. 12, the apparatus includes a sending module 410 and a second receiving module 420. The sending module 410 is configured to send downlink control information to a user terminal, where the downlink control information includes a resource indication domain, and the resource indication domain is configured to indicate a resource to the user terminal. The second receiving module 420 is configured to receive uplink transmission data sent by the user terminal according to the downlink control information.

In an embodiment, the downlink control information includes at least one resource indication domain, each of the at least one resource indication domain indicates a group of indication resources; and different groups of indication resources correspond to different power control parameters.

In an embodiment, the resource indication domain is configured to indicate an indication resource contained within a resource group corresponding to the resource indication domain based on a bitmap.

In an embodiment, a mapping relationship exists between the resource group and a power control parameter, where the power control parameter includes at least one of an open-loop power control parameter or a closed-loop power control parameter.

In an embodiment, the mapping relationship is determined in at least one of following manners: predefining by a protocol; configuring through a broadcast message; configuring through user-specific radio resource control signaling; configuring by user group specific radio resource control signaling; or jointly configuring by radio resource control signaling and medium access control layer signaling, where the radio resource control signaling is configured to configure a power control parameter pool, the medium access control layer signaling is configured to configure a mapping relationship between the power control parameter and the resource group, and the power control parameter is a subset selected in the power control parameter pool.

An embodiment of the present application further provides a user terminal. The uplink transmission method in the above embodiments may be performed by the uplink transmission apparatus, and the uplink transmission apparatus may be implemented by software and/or hardware and integrated in the user terminal.

Figure 13:
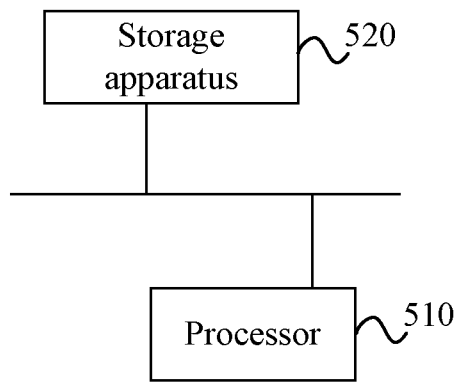
FIG. 13 is a schematic structural diagram of a user terminal provided in an embodiment.

FIG. 13 is a schematic structural diagram of a user terminal provided in an embodiment. As shown in FIG. 13, the user terminal includes a processor 510 and a storage apparatus 520. There may be one or more processors in the user terminal. In FIG. 13, one processor 510 is used as an example. The processor 510 and the storage apparatus 520 in the user terminal may be connected by a bus or in other manners. In FIG. 13, the processor 510 and the storage apparatus 520 in the user terminal being connected by the bus is used as an example.

When one or more programs are executed by the one or more processors, the one or more processors implement the uplink transmission method described in any of the above embodiments.

As a computer-readable storage medium, the storage apparatus 520 in the user terminal may be configured to store one or more programs, the one or more programs may be a software program, a computer-executable program, and a module, such as a program instruction/module corresponding to the uplink transmission method in the embodiments of the present application (for example, a module in the uplink transmission apparatus shown in FIG. 11 includes a first receiving module 310 and an uplink transmission module 320. The processor 510 executes various function applications and data processings of the user terminal by executing software programs, instructions and modules stored in the storage apparatus 520, that is, implements the uplink transmission method in the above method embodiment.

The storage apparatus 520 mainly includes a storage program region and a storage data region, the storage program region may store an operating system and an application program required by at least one function; the storage data region may store data and the like created according to use of the user terminal (such as, downlink control information, a power control parameter in the embodiments described above). Further, the storage apparatus 520 may include a high-speed random access memory, and may further include a non-volatile memory such as at least one magnetic disk storage device, a flash memory device, or another non-volatile solid-state storage apparatus. In some examples, the storage apparatus 520 may further include a memory remotely disposed relative to the processor 510, the remote memory may be connected to the user terminal via a network. Examples of the above networks include, but are not limited to, the Internet, an intranet, a local area network, a mobile communication network and combinations thereof.

Further, when one or more programs included in the user terminal point are executed by the one or more processors 510, and the uplink transmission method described in any of the foregoing embodiments is implemented.

An embodiment of the present application further provides a serving node. The resource indication method in the above embodiments may be executed by a resource indication apparatus, and the resource indication apparatus may be implemented by software and/or hardware and integrated in the serving node.

Figure 14:
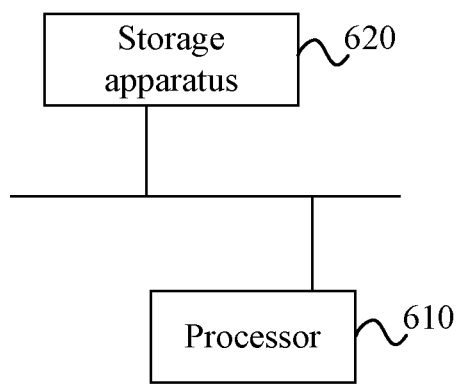
FIG. 14 is a schematic structural diagram of a serving node provided in an embodiment.

FIG. 14 is a schematic structural diagram of a serving node provided in an embodiment. As shown in FIG. 14, the serving node includes a processor 610 and a storage apparatus 620. There may be one or more processors in the serving node. In FIG. 14, one processor 610 is used as an example. The processor 610 and the storage apparatus 620 in the serving node may be connected by a bus or in other manners. In FIG. 14, the processor 610 and the storage apparatus 620 in the serving node being connected by the bus is used as an example.

When one or more programs are executed by the one or more processors, the one or more processors implement the resource indication method described in any of the above embodiments.

As a computer-readable storage medium, the storage apparatus 620 in the serving node may be configured to store one or more programs, the one or more programs may be a software program, a computer-executable program, and a module, such as a program instruction/module corresponding to the resource indication method in the embodiments of the present application (for example, a module in the resource indication apparatus shown in FIG. 12 includes a sending module 410 and a second receiving module 420. The processor 610 executes various function applications and data processings of the serving node by executing software programs, instructions and modules stored in the storage apparatus 620, that is, implements the resource indication method in the above method embodiment.

The storage apparatus 620 mainly includes a storage program region and a storage data region, the storage program region may store an operating system and an application program required by at least one function; the storage data region may store data and the like created according to use of the serving node (such as, downlink control information, a power control parameter in the embodiments described above). Further, the storage apparatus 620 may include a high-speed random access memory, and may further include a non-volatile memory such as at least one magnetic disk storage device, a flash memory device, or another non-volatile solid-state storage apparatus. In some examples, the storage apparatus 620 may further include a memory remotely disposed relative to the processor 610, the remote memory may be connected to the serving node via a network. Examples of the above networks include, but are not limited to, the Internet, an intranet, a local area network, a mobile communication network and combinations thereof.

Further, when one or more programs included in the serving node are executed by the one or more processors 610, and the resource indication method described in any of the foregoing embodiments is implemented.

An embodiment of the present application further provides a storage medium containing a computer executable instruction. The storage medium stores a computer program, and the computer program, when executed by a processor, implements the uplink transmission method or the resource indication method described in any of the embodiments.

Those skilled in the art will appreciate from the above description of the implementation manners that the present application may be implemented by means of software and general purpose hardware, and may also be implemented by hardware. Based on this understanding, the technical scheme of the present application may be embodied in the form of a software product, and the computer software product may be stored in a computer readable storage medium, such as a floppy disk of a computer, a read-only memory (ROM), a random access memory (RAM), a flash memory (FLASH), a hard disk or an optional disk, including multiple instructions to enable a computer device (which may be a personal computer, a server, or a network device, etc.) to perform the method described in any of the embodiments of the present application.

The above description is only an exemplary embodiment of the present application, and is not intended to limit the scope of protection of the present application.

Any block diagram of the logic flow in the accompanying drawings of the present application may represent program steps, or may represent interconnected logic circuits, modules, and functions, or may represent a combination of program steps and logic circuits, modules, and functions. The computer program may be stored on a memory. The memory may be of any type suitable for the local technical environment and may be implemented using any suitable data storage technology, such as, but not limited to, a ROM, a RAM, an optical memory device and system (digital versatile disc (DVD) or compact disk (CD)), etc. Computer readable media may include non-instantaneous storage media. Data processors may be of any type suitable for the local technical environment, such as, but not limited to, general-purpose computers, specialized computers, microprocessors, digital signal processors (DSP), application specific integrated circuits (ASIC), field-programmable gate array (FPGA)), and processors based on multi-core processor architectures.

What is claimed is:

1. An uplink transmission method, applied to a use terminal, comprising:
    receiving downlink control information from a serving node, wherein the downlink control information comprises at least one resource indication domain, each of the at least one resource indication domain indicates a group of indication resources, and different groups of indication resources correspond to different power control parameters; and
    determining an uplink transmission mechanism according to an indication resource indicated by the resource indication domain;
    wherein the uplink transmission mechanism comprises:
    in a case where a configured grant resource is overlapped with at least one group of indication resources, performing an uplink data transmission of a rate matching on the at least one group of indication resources within the configured grant resource; or
    in a case where a configured grant resource is overlapped with at least one group of indication resources, increasing transmitting power of an uplink transmission on the configured grant resource based on a power control parameter corresponding to the at least one group of indication resources.

2. The method of claim 1, wherein determining the uplink transmission mechanism according to the indication resource indicated by the resource indication domain comprises:
    determining an uplink transmission mechanism of a configured grant resource based on the indication resource according to a relationship between a modulation and coding scheme level and a first threshold value.

3. The method of claim 2, wherein determining the uplink transmission mechanism of the configured grant resource based on the indication resource according to the relationship between the modulation and coding scheme level and the first threshold value comprises:
    in a case where the modulation and coding scheme level is greater than or equal to the first threshold value, performing an uplink data transmission of a rate matching on the indication resource within the configured grant resource; and in a case where the modulation and coding scheme level is less than the first threshold value, increasing transmitting power of an uplink transmission on the configured grant resource according to a power control parameter corresponding to an indication resource overlapped with the configured grant resource.

4. The method of claim 1, wherein determining the uplink transmission mechanism according to the indication resource indicated by the resource indication domain comprises:

in a case where the uplink data transmission of the rate matching on the at least one group of indication resources is performed within the configured grant resource, calculating a first code rate adopted; and determining an uplink transmission mechanism of the configured grant resource according to a relationship between the first code rate and a second threshold value.

5. The method of claim 4, wherein determining the uplink transmission mechanism of the configured grant resource according to the relationship between the first code rate and the second threshold value comprises:

in a case where the first code rate is greater than or equal to the second threshold value, increasing the transmitting power of the uplink transmission on the configured grant resource according to the power control parameter corresponding to an indication resource overlapped with the configured grant resource; and in a case where the first code rate is less than the second threshold value, performing the uplink data transmission of the rate matching on the at least one group of indication resources within the configured grant resource.

6. The method of claim 1, wherein determining the uplink transmission mechanism according to the indication resource indicated by the resource indication domain comprises:

in a case where a configured grant resource is overlapped with at least two groups of indication resources, increasing transmitting power of an uplink transmission on the configured grant resource according to a maximum power adjustment amount in at least two power control parameters corresponding to the at least two groups of indication resources.

7. The method of claim 1, wherein determining the uplink transmission mechanism according to the indication resource indicated by the resource indication domain comprises:

in a case where a configured grant resource is overlapped with at least one group of indication resources, and a number of the configured grant resources is at least two, determining a target resource in the at least two configured grant resources according to the at least one group of indication resources; and determining an uplink transmission mechanism on the target resource.

8. The method of claim 7, wherein the uplink transmission mechanism comprises the followings:

performing an uplink data transmission of a rate matching on the at least one group of indication resources within the target resource; or increasing transmitting power of an uplink transmission on the target resource based on a power control parameter corresponding to the at least one group of indication resource.

9. The method of claim 7, wherein the target resource comprises:

a configured grant resource having no overlap with the at least one group of indication resources; or a configured grant resource having a most non-overlap region with the at least one group of indication resources.

10. The method of claim 8, wherein determining the uplink transmission mechanism on the target resource comprises:

determining the uplink transmission mechanism on the target resource according to a relationship between a modulation and coding scheme level and a third threshold value.

11. The method of claim 10, wherein determining the uplink transmission mechanism on the target resource according to the relationship between the modulation and coding scheme level and the third threshold value comprises:

in a case where the modulation and coding scheme is greater than or equal to a third threshold value, performing the uplink data transmission of the rate matching on the at least one group of indication resources within the target resource; and in a case where the modulation and coding scheme is less than the third threshold value, increasing the transmitting power of the uplink transmission on the target resource according to a power control parameter corresponding to an indication resource overlapped with the target resource.

12. The method of claim 8, wherein determining the uplink transmission mechanism on the target resource comprises:

in a case where the uplink data transmission of the rate matching on the at least one group of indication resources is performed within the target resource, calculating a second code rate adopted; and determining the uplink transmission mechanism on the target resource according to a relationship between the second code rate and a fourth threshold value.

13. The method of claim 12, wherein determining the uplink transmission mechanism on the target resource according to the relationship between the second code rate and the fourth threshold value comprises:

in a case where the second code rate is greater than or equal to the fourth threshold value, increasing the transmitting power of the uplink transmission on the target resource according to a power control parameter corresponding to an indication resource overlapped with the target resource; and in a case where the second code rate is less than the fourth threshold value, performing the uplink data transmission of the rate matching on the at least one group of indication resources within the target resource.

14. The method of claim 7, wherein determining the uplink transmission mechanism on the target resource comprises:

in a case where the target resource is overlapped with at least two groups of indication resources, increasing transmitting power of an uplink transmission on the target resource according to a maximum power adjustment amount in at least two power control parameters corresponding to the at least two groups of indication resources.

15. A resource indication method, applied to a serving node, comprising:
   sending downlink control information to a user terminal, wherein the downlink control information comprises at least one resource indication domain, each of the at least one resource indication domain indicates a group of indication resources, and different groups of indication resources correspond to different power control parameters, wherein an indication resource indicated by the resource indication domain is used to enable the user terminal to determine an uplink indication domain; and
   receiving uplink transmission data, wherein the uplink transmission data is sent from the user terminal according to the downlink control information
   wherein the uplink transmission mechanism comprises:
   in a case where a configured grant resource is overlapped with at least one group of indication resources, performing an uplink data transmission of a rate matching on the at least one group of indication resources within the configured grant resource; or
   in a case where a configured grant resource is overlapped with at least one group of indication resources, increasing transmitting power of an uplink transmission on the configured grant resource based on a power control parameter corresponding to the at least one group of indication resources.

16. The method of claim 15, wherein the each resource indication domain is configured to indicate, based on a bitmap, an indication resource contained within a respective group of indication resources corresponding to the each resource indication domain.

17. The method of claim 16, wherein a mapping relationship exists between the different groups of indication resources and the different power control parameters, wherein the power control parameter comprises at least one of an open-loop power control parameter or a closed-loop power control parameter.

18. The method of claim 17, wherein the mapping relationship is further determined in at least one of following manners:
   predefining by a protocol;
   configuring through a broadcast message; or
   jointly configuring by the radio resource control signaling and medium access control layer signaling, wherein the radio resource control signaling is configured to configure a power control parameter pool, the medium access control layer signaling is configured to configure a mapping relationship between the power control parameter and the resource group, and the power control parameter is a subset selected in the power control parameter pool.

19. A user terminal, comprising:
   at least one processor; and
   a storage apparatus, which is configured to store at least one program;
   wherein the at least one program, when executed by the at least one processor, causes the at least one processor to implement the uplink transmission method of claim 1.

20. A serving node, comprising:
   at least one processor; and
   a storage apparatus, which is configured to store at least one program;
   wherein the at least one program, when executed by the at least one processor, causes the at least one processor to implement the resource indication method of claim 5.

21. A non-transitory computer-readable storage medium storing a computer program, wherein the program, when executed by a processor, implements the uplink transmission method of claim 1.

* * * * *